(12) United States Patent
Rolff et al.

(10) Patent No.: US 6,474,172 B1
(45) Date of Patent: Nov. 5, 2002

(54) METHOD FOR MEASURING THE GAS PRESSURE IN A CONTAINER, AND DEVICES FOR ITS APPLICATION

(75) Inventors: Norbert Rolff, Horrem (DE); Rudolf Stocker, Azmoos (CH)

(73) Assignee: Unakis Balzers AG, Furstentum Liechtenstein ( * ) Notice: Subject to any disclaimer, the term of this patent is extended or adjusted under 35 U.S.C. 154(b) by 0 days.

(21) Appl. No.: 09/508,605

(22) PCT Filed: Sep. 1, 1998

(86) PCT No.: PCT/CH98/00375
§ 371 (c)(1),
(2), (4) Date: May 10, 2000

(87) PCT Pub. No.: WO99/15869
PCT Pub. Date: Apr. 1, 1999

(30) Foreign Application Priority Data

Sep. 22, 1997 (CH) .............................................. 2216/97

(51) Int. Cl.[7] .............................................. G01L 21/12
(52) U.S. Cl. .............................. 73/755; 73/708; 73/719
(58) Field of Search ......................... 73/755, 720, 716, 73/717, 719, 726, 756, 708; 340/870.38

(56) References Cited

U.S. PATENT DOCUMENTS 3,066,537 A * 12/1962 Rivera ........................ 73/755
4,541,286 A * 9/1985 Holme ........................ 73/755
5,693,888 A * 12/1997 Enderes et al. ............. 73/755
5,962,791 A * 10/1999 Walchli et al. ............. 73/755

FOREIGN PATENT DOCUMENTS

GB 2105047 A * 3/1983

* cited by examiner

Primary Examiner—Harshad Patel
(74) Attorney, Agent, or Firm—Notaro & Michalos P.C.

(57) ABSTRACT

Two resistance elements (3, 6) are used for eliminating the influence of wall temperature on the gas pressure in a vessel, determined by a Pirani manometer. The first resistance element (3) is present in a first branch of a Wheatstone bridge (1), and the voltage is tapped by means of a voltage divider (7). The second resistance element (6) is present with a series resistance (5) in the second branch and is adjusted to a lower temperature. The changes in the voltages tapped at the branches are essentially identical for identical temperature changes at the resistance elements (3, 6), so that the Wheatstone bridge (1) remains balanced. The adjustment is improved by a constant current source (11). Another embodiment uses only one resistance element, whose temperature is reduced periodically during the balancing of the Wheatstone bridge and, after thermal equilibrium has been established, is determined by determining its resistance by means of a low constant current and is used for the computational compensation of the effect of the wall temperature. In a further embodiment, transient effects are produced by periodically switching a resistance back and forth and the frequencies are measured, from which the gas pressure is then determined.

20 Claims, 2 Drawing Sheets

METHOD FOR MEASURING THE GAS PRESSURE IN A CONTAINER, AND DEVICES FOR ITS APPLICATION

FIELD AND BACKGROUND OF THE INVENTION

The invention relates to a method and apparatus for measuring gas pressure in a vessel.

It has long been known that the pressure in a vessel can be measured by the Pirani method, by measuring the electric power obtained at a resistance element, for example a slide wire, which power gives the heat transfer from the resistance element to the vessel wall. Using the known relationship between pressure and thermal conductivity of the gas, it is finally possible to determine the required gas pressure in the vessel from the heat transfer between resistance element and vessel wall.

However, it is also known that there are in this method of measurement various interfering factors which can be eliminated or compensated with difficulty or only with considerable effort. Not only is the thermal conduction by the gas dependent on the temperature of the vessel wall, but the heat transfer between resistance element and vessel wall also contains components which are caused by radiant exchange and thermal conduction in the region of the connections of the resistance element. The two components are also highly dependent on the temperature of the vessel wall, which can be measured only with considerable effort to the extent required for a sufficiently accurate measurement.

Attempts have already been made to compensate the temperature influences by installing a temperature-dependent resistance in a Wheatstone bridge containing the resistance element. However, it is very difficult to achieve satisfactory compensation over a relatively large pressure range in this way.

DE-A-43 08 434 also discloses that, in such a solution, it is possible to measure the resistance value of temperature dependent resistance and to use it for an additional, for example computational temperature compensation. Here too, however, the compensation of the temperature influence is not absolutely optimal in spite of the considerable effort.

SUMMARY OF THE INVENTION

It is accordingly the object of the invention to provide a method of measurement in which interfering factors are eliminated in a radical and simultaneously simple manner and in particular the influence of the wall temperature on the value determined for the gas pressure is compensated over a large pressure range.

The invention provides a method in which the gas pressure is determined in a simple manner in a form essentially unimpaired by interference, from readily obtainable electrical variables. Also provided are apparatuses by means of which the method according to the invention can be carried out in a particularly advantageous manner. The proposed embodiments make it possible, depending on the requirements regarding the accuracy of measurement, to carry out a very accurate determination of the gas pressure by means of separate measurement and digital processing of the electrical variables.

BRIEF DESCRIPTION OF THE DRAWINGS

Below, the invention is explained in more detail with reference to Figures, which merely show embodiments.

DESCRIPTION OF THE PREFERRED EMBODIMENTS

The measurement of the pressure is based on the formula for the power output as a result of heat transfer from the resistance element to the vessel wall, as a function of the gas pressure p in the vessel, the temperature T of the resistance element and the wall temperature $T_W$:

$$N(p)=\alpha(\epsilon T^4-\epsilon_W T_W^4)+\beta(T-T_W)/\sqrt{T_W}\times p+\gamma(T-T_W), \qquad (1)$$

which formula is known, for example, from H. R. Hidber and G. Süiss: "Pirani manometer with linearized response", Rev. Sci. Instrum. 47/8 (1976), 912–914.

Here, the first term relates to the heat transfer by radiation and the last term to that by thermal conduction in the region of the connections of the resistance element, while the middle term describes the heat transfer caused by the pressure-dependent thermal conduction by the gas, for a range of pressures below 1 mbar, which is of particular interest here. With the use of a slightly more complicated formula for the dependence of this term on the pressure, which also takes into account the saturation at higher pressures, the method according to the invention can however also be applied, without major changes, to a substantially larger pressure range.

(1) contains, as a factor difficult to eliminate, the wall temperature $T_W$, which can substantially influence the results of the measurement. According to the basic concept of the invention, the effect of the wall temperature is either suppressed at the outset by designing the circuit in such a way that changes due to the influence of the ambient temperature in the resistance of resistance elements do not substantially influence the electrical state of the apparatus or are computationally compensated by determining the temperature of a resistance element, at low electrical load, over its resistance when the latter is in thermal equilibrium with the environment, or by switching back and forth between two different temperatures and heuristically compensating the dependence of the measured results obtained on the ambient temperature.

Figure 1:
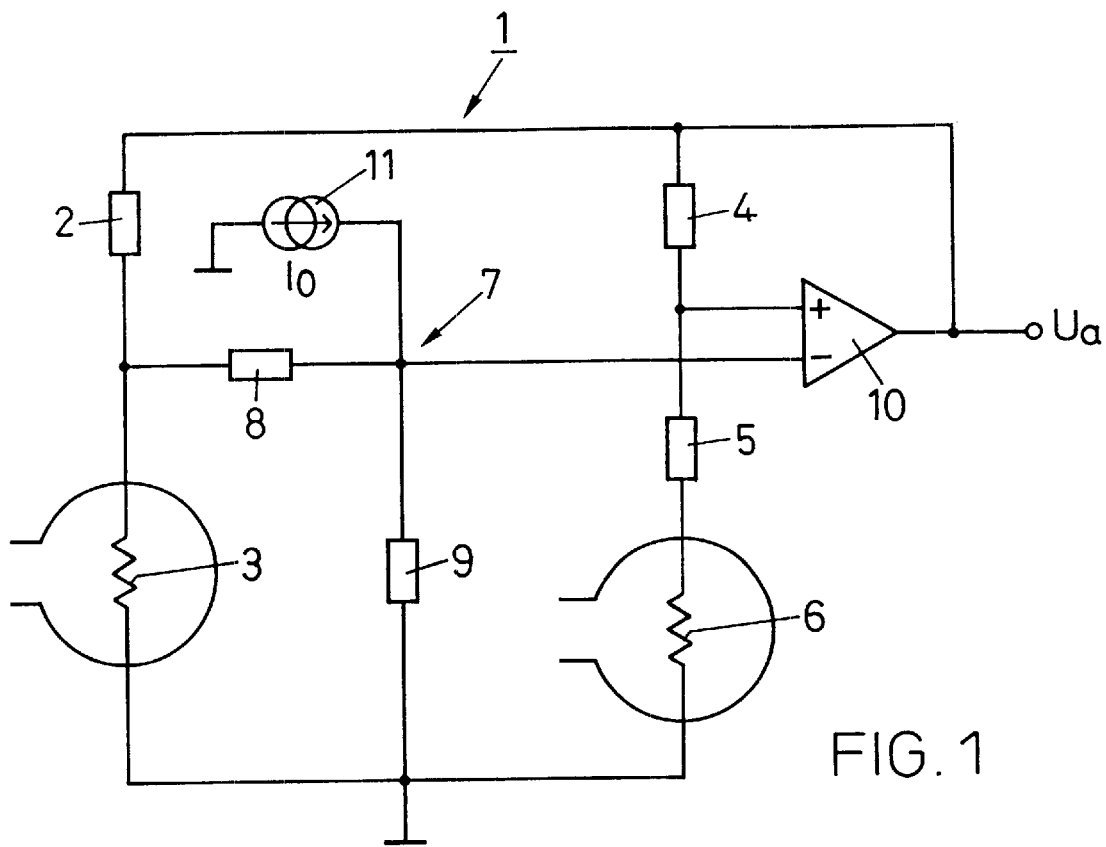
FIG. 1 shows a first embodiment of the circuit diagram of an apparatus according to the invention for carrying out the method according to the invention.

The apparatus according to FIG. 1 comprises a Wheatstone bridge 1 having a first branch which contains in series a first bridge resistance 2 and, in the vessel to be monitored, a first resistance element 3, preferably a slide wire. In a second branch parallel thereto, are a second bridge resistance 4 and a series resistance 5 with a second resistance 6, likewise a slide wire, in series, arranged in the same vessel, preferably close to the first resistance element 3.

Between the first bridge resistance 2 and the first resistance element 3 is a tap which is connected to an inverting input of an operational amplifier 10 via a voltage divider 7 consisting of high-impedance resistances 8, 9, while a second tap between the second bridge resistance 4 and the series resistance 5 is connected to its noninverting input. The output of the operational amplifier 10 feeds the Wheatstone bridge 1 and also delivers the output voltage $U_a$.

A constant current source 11 which supplies a constant current $I_0$ is connected to the output of the voltage divider parallel to the first resistance element 3, between the resistances 8 and 9. The resistance $R_{P1}$ of the first resistance element 3 and the resistance $R_{P2}$ of the second resistance element 6 each have a positive temperature coefficient.

The Wheatstone bridge 1 is kept in a balanced state by the operational amplifier 10. If the values of the first bridge resistance 2 and of the second bridge resistance 4 are denoted by $R_{G1}$, $R_{G2}$, the value of the series resistance 5 is denoted by $R_V$ and the dividing factor of the voltage divider 7 is denoted by k and the constant current $I_0$ is neglected at first, we have:

$$k \times R_{P1}/(R_{P1}+R_{G1})=(R_V+R_{P2})/(R_{G2}+R_V+R_{P2}) \qquad (2)$$

The resistances can now be dimensioned in such a way that, for a specific pressure, which is preferably in the upper part of the measuring range, and for an average wall temperature, the derivative of the left term in (2) with respect to the temperature $T_1$ of the first resistance element 3 corresponds to that of the right term with respect to the temperature $T_2$ of the second resistance element 6.

Since the temperatures $T_1$, $T_2$ of the first resistance element 3 and of the second resistance element 6 change in the same way when the wall temperature $T_W$ changes, the equality of the terms is therefore essentially retained. As a result of supplying the constant current $I_0$, the left term is slightly shifted so that, with the same temperature changes, the two terms correspond at two points and are very close together in between. There is therefore substantially no adjustment of the Wheatstone bridge 1 with identical changes of the temperatures $T_1$, $T_2$ of the resistance elements 3, 6 in said range, i.e. the output voltage $U_a$ experiences virtually no change when the wall temperature $T_W$ changes.

The dimensioning can be chosen, for example, as follows: $R_{G1}=100\Omega$, $R_{G2}=475\Omega$, $R_V=128\Omega$. The resistance elements 3, 6 each have a cold resistance of $87\Omega$. The resistances 8, 9 of the voltage divider 7 are high-impedance, as mentioned above, so that they have virtually no effect on the current through the Wheatstone bridge 1. They may be chosen, for example, to be 82.2 k$\Omega$ and 100 k$\Omega$. Finally, the constant current $I_0$ may be, for example, 1 $\mu$A.

The two branches of the Wheatstone bridge 1 are in any case adjusted so that a relatively high current flows through the branch containing the first resistance element 3 and a substantially lower current flows through the branch containing the second resistance element 6. The resistance elements 3 and 6 therefore also have different temperatures $T_1$, $T_2$. The temperature changes of the resistances $R_{P1}$, $R_{P2}$ of the resistance elements which are caused by changes in the pressure and in the resultant heat loss are therefore likewise different and lead to a rebalancing of the Wheatstone bridge 1 by the operational amplifier 10, which is also reflected in a change in the output voltage $U_a$.

The evaluation of the output signal is carried out essentially according to a recorded calibration curve since the purely computational evaluation would be possible only with considerable effort, owing to the relatively complicated design of the apparatus. It is also possible to measure the resistance at different temperatures at one and the same resistance element by changing the temperature, for example by periodically switching a resistance of a Wheatstone bridge containing the resistance element.

Figure 2:
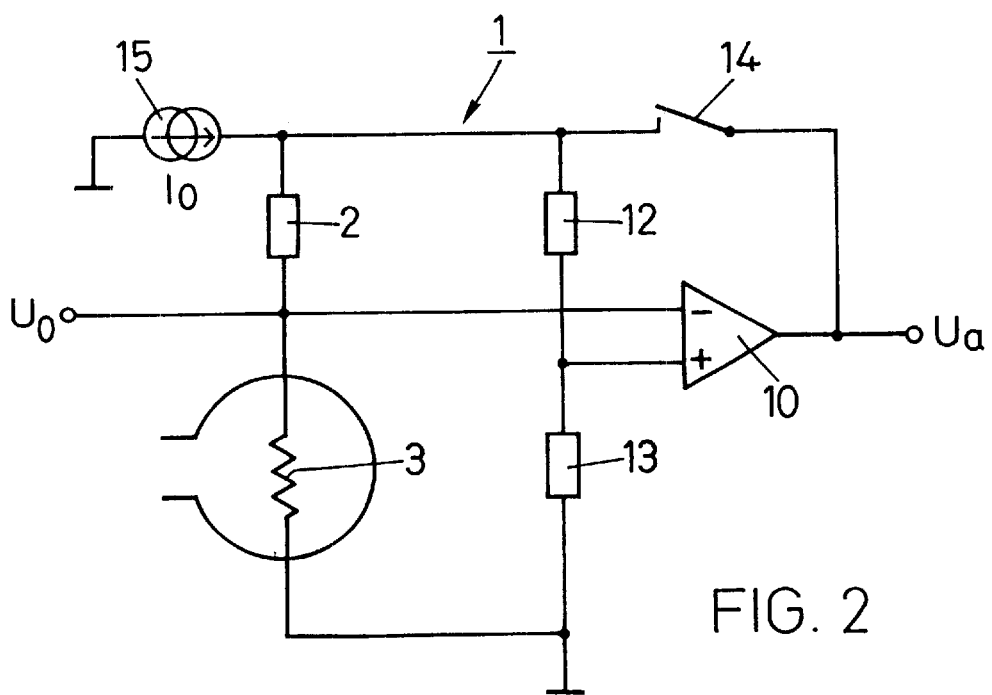
FIG. 2 shows a second embodiment of the circuit diagram of an apparatus according to the invention for carrying out the method according to the invention.

This takes place specifically in a slightly different way in the apparatus according to FIG. 2. It likewise comprises a Wheatstone bridge 1 having a first branch which contains, in series, a first bridge resistance 2 and a resistance element 3 arranged in the vessel and preferably in the form of a slide wire and a second branch comprising a series circuit of two base resistances 12, 13. The Wheatstone bridge 1 is in turn balanced by an operational amplifier 10, this being effected by means of a switch 14, for example a transistor. A constant current source 15 supplies a constant current $I_0$ to the Wheatstone bridge 1. The bridge resistance 2 may have, for example, a value of 100$\Omega$ and the base resistances 12, 13 a value of 10 k$\Omega$ and 14 k$\Omega$, respectively, while the cold resistance of the resistance element 3 is 87$\Omega$. The constant current $I_0$ may be 100 $\mu$A.

When switch 14 is closed, the Wheatstone bridge 1 is balanced by the operational amplifier 10. After thermal stabilization of the circuit, the resistance $R_p$ of the resistance element 3 is obtained in a known manner from the output voltage $U_a$ and constant resistance values, and the temperature $T_1$ of the resistance element 3 is also obtained from the known relationship between temperature and resistance $R_p$, and in addition the voltage drop across said resistance element 3 and hence the pressure-dependent power N(p) output by it as a result of radiation and thermal conduction, whereby of course, according to (1), the wall temperature $T_W$ which is not accurately known influences this variable.

By opening the switch 14, the balancing of the Wheatstone bridge 1 is discontinued. After thermal stabilization—it may be possible to determine the final value beforehand from the curve of the transient effect—a component of the constant current $I_0$, which is preferably rated so that it does not significantly heat the resistance element 3, flows through said resistance element 3. From the voltage $U_0$ drop across the resistance element 3 and the known values of the further resistances in the Wheatstone bridge 1, it is now possible in turn to determine the resistance of the resistance element 3 and to determine its temperature $T_2$, which now corresponds to the wall temperature $T_W$. After substitution of this value in (1), the equation can be solved for p.

Figure 3:
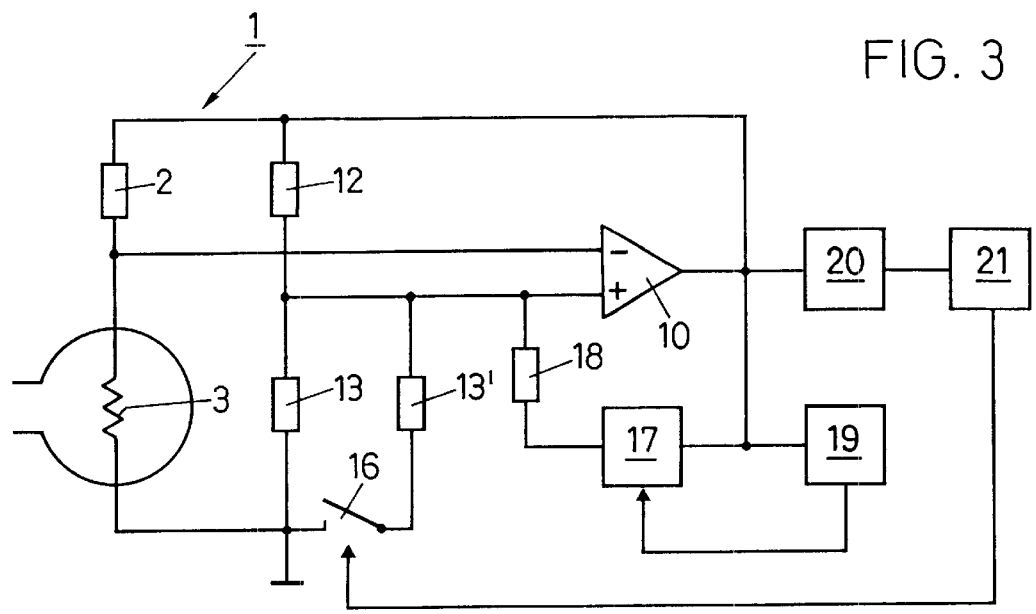
FIG. 3 shows a third embodiment of the circuit diagram of an apparatus according to the invention for carrying out the method according to the invention and FIG. 4 shows curves for constant pressure and for constant temperature in a plane of variables determined by means of the apparatus according to FIG. 3.

The apparatus according to FIG. 3 in turn comprises a Wheatstone bridge 1 having a bridge resistance 2 of, for example, 100$\Omega$ and a resistance element 3 connected in series to said bridge resistance 2 and arranged in the vessel, preferably a slide wire having a cold resistance of 87$\Omega$, in a first branch and two base resistances 12, 13 of, for example, 10 k$\Omega$ and 14 k$\Omega$ in a second branch, which bridge is balanced by an operational amplifier 10. A parallel resistance 13' of, for example, 120 k$\Omega$ can be connected in parallel to the second base resistance 13 by means of a switch 16.

An amplifier 17, which is led back to the noninverting input of said operational amplifier 10 via a coupling resistance 18 of, for example, 1 M$\Omega$, and, parallel thereto, an amplitude controller 19 are connected to the output of the operational amplifier 10. In addition, the output voltage $U_a$ is fed to a frequency meter 20, which transmits the result of its measurement to a microprocessor 21. The microprocessor 21 also actuates the switch 16.

If the switch 16 is, for example, opened, a transient effect is triggered, in which the resistance element 3 assumes a temperature $T_1$. As a result of the feedback of the Wheatstone bridge 1 via the amplifier 17, which feedback is controlled by the amplitude controller 19, the oscillation about the rest position corresponding to complete balance is stabilized, the amplifier 17 being controlled in such a way that the amplitude of the oscillation assumes a fixed, relatively small value. The frequency $v_1$ of this oscillation, which depends on the gas pressure p and also on the wall temperature $T_W$ through the thermal conductivity and the heat capacity of the gas, is measured by the frequency meter 20 and transmitted to the microprocessor 21.

This closes the switch 16, for example after the apparatus and hence the measured frequency $v_1$ have completely stabilized, and thus results in a change in the dividing ratio and causes rebalancing of the Wheatstone bridge 1 by adjustment of the resistance element 3 to a lower resistance and hence a lower temperature $T_2$. About this rest position, too, an oscillation is generated whose frequency $v_2$, after stabilization of the apparatus, is measured by the frequency meter 20 and in turn depends on the gas pressure p and also on the wall temperature $T_W$ through the thermal conductivity and the heat capacity of the gas. At a wall temperature $T_W$ of about 25° C., frequencies of the order of magnitude of 50 Hz at $10^{-3}$ mbar and 2 kHz at 1 bar result in the case of the above-mentioned dimensions.

Figure 4:
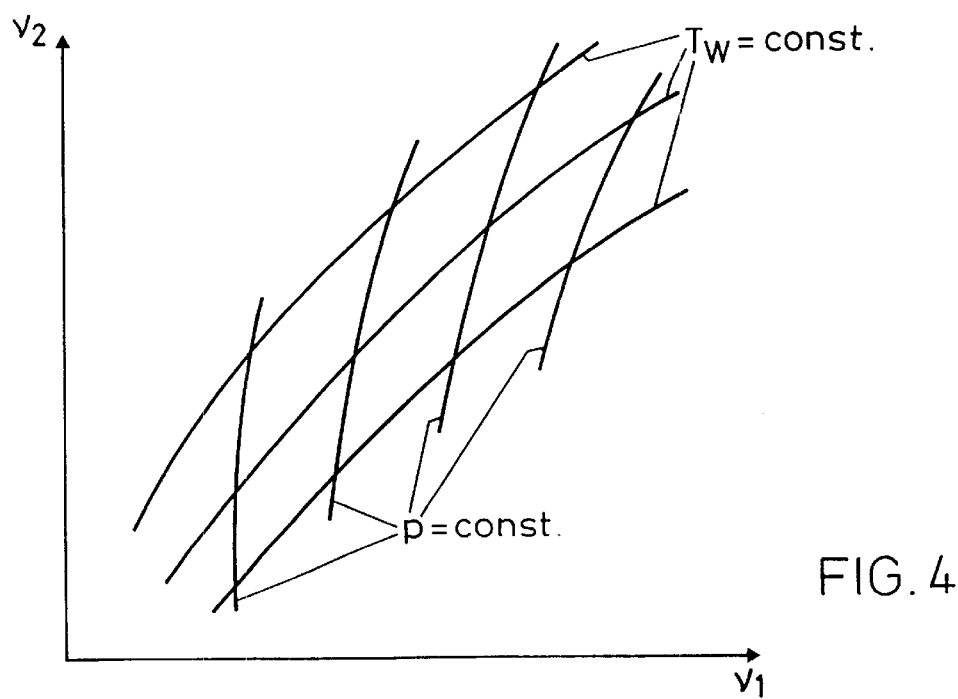

In the plane defined by $v_1$ and $v_2$ (cf. FIG. 4), each point corresponds to a pressure-temperature pair (p, $T_W$). The $v_1$ and $v_2$ values corresponding to specific pressures and wall temperatures can be determined by calibration measurements and are stored in tabulated form in a memory. Conversely, the microprocessor 21 can determine the pressure p and the wall temperature $T_W$ from a frequency pair ($v_1$, $v_2$) by interpolation from the closest stored values. FIG. 4 shows lines of constant wall temperature $T_W$ and lines of constant gas pressure p. Here too, the gas pressure p is therefore determined on the basis of electrical variables which occur in succession at one and the same resistance element 3.

What is claimed is:

1. A method for measuring gas pressure (p) in a vessel comprising the steps of:
    providing at least one resistance element (3) in the vessel at a location spaced from the wall of the vessel, the at least one resistance element being in heat-conducting contact with the wall through the gas;
    passing an electric current through the at least one resistance element;
    measuring electrical variables in the at least one resistance element at at least two different measuring temperatures (T1, T2) of the at least one resistance element; and
    determining the gas pressure (p) as a function of said variables.

2. A method according to claim 1, including providing only a single resistance element (3) in the vessel.

3. A method according to claim 1, including at least periodically subjecting the resistance element (3) to a known constant current ($I_0$), determining a resistance of the resistance element (3) from a voltage drop ($U_0$) at the resistance element and determining a wall temperature ($T_W$) of the vessel wall from said resistance, the wall temperature being useful for determining the gas pressure.

4. A method according to claim 3, including providing a Wheatstone bridge (1) which can be balanced by an operational amplifier (10) and which has a first branch containing the at least one resistance element (3), connecting an output of the operational amplifier (10) to the Wheatstone bridge (1) through a switch (14) and connecting a constant current source (15) to said Wheatstone bridge (1).

5. A method according to claim 1, including providing a system for the at least one resistance element which oscillates at a frequency that is dependant on the electrical variables in the at least one resistance element at each of the measuring temperatures (T1, T2), measuring each frequency, and determining the gas pressure from the measured frequencies.

6. A method according to claim 5, including providing a Wheatstone bridge (1), balancing the bridge using an operational amplifier (10), the bridge having a first branch containing the at least one resistance element (3), and feeding back an output of the operational amplifier (10) through another amplifier (17) controlled by an amplitude controller (19).

7. A method according to claim 6, including switching at least one resistance value in one branch of the Wheatstone bridge (1) for changing a dividing ratio of the bridge.

8. A method according to claim 1, including providing a Wheatstone bridge (1), balancing the bridge using an operational amplifier (10), the bridge having a first branch containing a first resistance element (3) and a second branch containing a second resistance element (6), adjusting the second resistance element so that, at at least one point of a measuring range, linearized dependencies of voltages being tapped at a tap of the Wheatstone bridge (1) for the purpose of balancing on the measuring temperature (T1, T2) of the resistance elements (3, 6) are identical in the respective first and second branches.

9. A method according to claim 8, including providing the tap on the Wheatstone bridge (1), between a first bridge resistance (2) and the first resistance element (3) in the first branch, and connecting the tap to the operational amplifier (10) through a voltage divider (7), and providing a series resistance (5) directly up circuit of the second resistance element (6).

10. A method according to claim 9, including connecting an output of the voltage divider (7) to a constant current source (11).

11. A method for measuring gas pressure (p) in a vessel having a wall, comprising the steps of:
    providing a pair of spaced apart resistance elements (3, 6) in the vessel at locations which are spaced from the wall of the vessel, the resistance elements being in heat-conducting contact with the wall through the gas;
    passing an electric current through each of the resistance elements;
    measuring electrical variables at at least two different measuring temperatures (T1, T2) in the resistance elements; and
    determining the gas pressure (p) as a function of said variables.

12. A method according to claim 11, including adjusting the two resistance elements (3, 6) to the different temperatures (T1, T2) and compensating for identical temperature changes.

13. A method according to claim 11, including providing a Wheatstone bridge (1), balancing the bridge using an operational amplifier (10), the bridge having a first branch containing a first one of the resistance elements (3) and a second branch containing a second one of the resistance elements (6), and selecting resistances in the bridge so that, at at least one point of a measuring range, linearized dependencies of voltages tapped at a tap of the Wheatstone bridge (1) for the purpose of balancing on the measuring temperatures (T1, T2) of the respective resistance elements (3, 6) pre identical in the first and second branches.

14. A method according to claim 13, including providing the tap on the Wheatstone bridge (1), between a first bridge resistance (2) and the first resistance element (3) in the first branch, connecting the tap to the operational amplifier (10) through a voltage divider (7), and providing a series resistance (5) directly up circuit of the second resistance element (6).

15. An apparatus for measuring gas pressure (p) in a vessel comprising:

a Wheatstone bridge (1) having an operational amplifier for balancing the bridge, a first branch containing a first resistance element (3) and a second branch containing a second resistance element (6), the first and second resistance elements being adapted for placement in the vessel at a location spaced from the wall of the vessel and the resistance elements being in heat-conducting contact with the wall through the gas, resistances in the bridge being selected so that, at at least one point of a measuring range, linearized dependencies of voltages tapped at a tap of the Wheatstone bridge (1) for the purpose of balancing on measuring temperatures (T1, T2) of the respective resistance elements (3, 6) are identical in the first and second branches;

means for passing an electric current through the resistance elements; and means for measuring electrical variables in the resistance elements at the measuring temperatures (T1, T2), the gas pressure (p) being determined as a function of said variables.

16. An apparatus according to claim 15, wherein the first branch includes a first bridge resistance (2), the tap being between the first bridge resistance (2) and the first resistance element (3) in the first branch, the tap being connected to the operational amplifier (10) through a voltage divider (7), and a series resistance (5) directly up circuit of the second resistance element (6).

17. An apparatus according to claim 16, including an output of the voltage divider (7) being connected to a constant current source (11).

18. An apparatus for measuring gas pressure (p) in a vessel comprising:

a Wheatstone bridge (1) with an operational amplifier (10) for balancing the bridge, the bridge including a first branch containing a resistance element (3) that is adapted for placement in the vessel at a location spaced from the wall of the vessel, the resistance element being in heat-conducting contact with the wall through the gas in the vessel;

a switch (14) connected to an output of the operational amplifier (10) and to a constant current source (15) connected to the Wheatstone bridge (1), for at least periodically subjecting the resistance element (3) to a known constant current (10) for determining a resistance of the resistance element (3) from a voltage drop ($U_0$) at the resistance element and for determining a wall temperature ($T_W$) of the vessel wall from said resistance, the wall temperature being useful for determining the gas pressure; and means for measuring electrical variables in the resistance element at at least two different measuring temperatures (T1, T2) in the vessel for determining the gas pressure (p) as a function of said variables.

19. An apparatus for measuring gas pressure (p) in a vessel comprising:

a Wheatstone bridge (1) with an operational amplifier (10) for balancing the bridge, the bridge including a first branch containing a resistance element (3) that is adapted for placement in the vessel at a location spaced from the wall of the vessel, the resistance element being in heat-conducting contact with the wall through the gas in the vessel;

another amplifier (17) controlled by an amplitude controller (19) and connected as a feed back from an output of the operational amplifier (10) to an input of the operational amplifier; and means for measuring variables that are associated with the resistance element at at least two different measuring temperatures (T1, T2) in the vessel for determining the gas pressure (p) as a function of said variables.

20. An apparatus according to claim 19, including at least one resistance value in one branch of the Wheatstone bridge (1) being switchable for changing a dividing ratio of the bridge.

* * * * *